United States Patent
Hiramatsu et al.

(10) Patent No.: US 9,305,707 B2
(45) Date of Patent: Apr. 5, 2016

(54) METHOD FOR MANUFACTURING CERAMIC ELECTRONIC COMPONENT AND CERAMIC ELECTRONIC COMPONENT INCLUDING CROSS-LINKED SECTION

(71) Applicant: Murata Manufacturing Co., Ltd., Nagaokakyo-shi, Kyoto-fu (JP)

(72) Inventors: Takashi Hiramatsu, Nagaokakyo (JP); Kunihiko Hamada, Nagaokakyo (JP)

(73) Assignee: Murato Manufacturing Co., Ltd., Kyoto (JP)

( * ) Notice: Subject to any disclaimer, the term of this patent is extended or adjusted under 35 U.S.C. 154(b) by 225 days.

(21) Appl. No.: 13/914,944

(22) Filed: Jun. 11, 2013

(65) Prior Publication Data

US 2013/0329334 A1 Dec. 12, 2013

(30) Foreign Application Priority Data

Jun. 12, 2012 (JP) ................. 2012-132724

(51) Int. Cl.
*H01G 4/12* (2006.01)
*H01G 4/30* (2006.01)
*H01G 4/232* (2006.01)
*H01G 13/00* (2013.01)

(52) U.S. Cl.
CPC ............. *H01G 4/12* (2013.01); *H01G 4/232* (2013.01); *H01G 4/30* (2013.01); *H01G 13/00* (2013.01); *Y10T 29/417* (2015.01)

(58) Field of Classification Search
CPC ........... H01G 4/30; H01G 4/12; H01G 4/232; H01G 4/0085; Y10T 29/435
See application file for complete search history.

(56) References Cited

U.S. PATENT DOCUMENTS

| | | | | |
|---|---|---|---|---|
| 8,264,815 | B2 * | 9/2012 | Yun et al. | 361/311 |
| 2006/0198078 | A1 * | 9/2006 | Miyauchi et al. | 361/305 |
| 2010/0008017 | A1 * | 1/2010 | Ito et al. | 361/301.4 |
| 2010/0085682 | A1 * | 4/2010 | Abe et al. | 361/303 |
| 2011/0110014 | A1 * | 5/2011 | Hirata et al. | 361/301.4 |
| 2012/0140376 | A1 * | 6/2012 | Ishihara et al. | 361/301.4 |
| 2012/0147518 | A1 * | 6/2012 | Matsuda et al. | 361/301.4 |
| 2013/0222973 | A1 * | 8/2013 | Wada et al. | 361/321.2 |

FOREIGN PATENT DOCUMENTS

| | | |
|---|---|---|
| JP | 05304042 A * | 11/1993 |
| JP | 09069463 A * | 3/1997 |
| JP | 2003-77761 A | 3/2003 |
| WO | WO 2011024582 A1 * | 3/2011 |

OTHER PUBLICATIONS

Machine translation of JP09-069463A, published Mar. 11, 1997.*

* cited by examiner

*Primary Examiner* — David M Sinclair
(74) *Attorney, Agent, or Firm* — Keating & Bennett, LLP

(57) ABSTRACT

In a ceramic electronic component, a first internal electrode includes a first opposed section and a first extraction section. The first opposed section is opposed to a second internal electrode with a ceramic layer interposed therebetween. The first extraction section is located closer to a first end surface than the first opposed section. The first extraction section is connected to a first external electrode. The number of cross-linked sections per unit area in the first extraction section is less than the number of cross-linked sections per unit area in the first opposed section.

19 Claims, 4 Drawing Sheets

METHOD FOR MANUFACTURING CERAMIC ELECTRONIC COMPONENT AND CERAMIC ELECTRONIC COMPONENT INCLUDING CROSS-LINKED SECTION

BACKGROUND OF THE INVENTION

1. Field of the Invention

The present invention relates to a method for manufacturing a ceramic electronic component, and the ceramic electronic component.

2. Description of the Related Art

Conventionally, ceramic electronic components, such as ceramic capacitors, have been used for various applications. For example, JP 2003-77761 A discloses, as an example of the components, a laminated ceramic capacitor in which a ceramic material having large grains grown more than those in a ceramic material defining dielectric ceramic layers is included in internal electrode layers. JP 2003-77761 A describes that the ceramic material having large grown grains provided in the internal electrode layers can suppress delamination between the dielectric ceramic layers and the internal electrode layers.

In recent years, there has been an increasing demand for further improved reliability of ceramic electronic components.

SUMMARY OF THE INVENTION

Preferred embodiments of the present invention provide a ceramic electronic component having improved reliability.

A preferred embodiment of the present invention provides a method for manufacturing a ceramic electronic component that includes a ceramic body including first and second principal surfaces, first and second side surfaces, and first and second end surfaces, a first internal electrode provided in the ceramic body, the first internal electrode extending in a direction from the first end surface, a second internal electrode provided in the ceramic body opposite to the first internal electrode with a ceramic layer interposed therebetween, the second internal electrode extending in the direction from the second end surface, a first external electrode provided on the first end surface and connected to the first internal electrode, and a second external electrode provided on the second end surface and connected to the second internal electrode, wherein the ceramic body includes a cross-linked section penetrating through the first internal electrode, and providing a cross-linkage for the ceramic layers adjacent with the first internal electrode interposed therebetween. In the method for manufacturing a ceramic electronic component according to the present preferred embodiment of the present invention, a green sheet laminated body is prepared by stacking a plurality of ceramic green sheets including a ceramic green sheet for the ceramic body, the ceramic green sheet including, on a surface thereof, a conductive paste layer of the first or second internal electrode. A firing step is performed for preparing the ceramic body by firing the green sheet laminated body. In the firing step, the green sheet laminated body is heated at such a rate that makes a surface layer of the green sheet laminated body fired earlier than a central section of the green sheet laminated body.

In a preferred embodiment of the method for manufacturing a ceramic electronic component according to the present invention, for the green sheet laminated body in the firing step, a temperature is preferably increased at about 50° C./second to about 150° C./second in a temperature range of at least about 500° C., for example.

In another preferred embodiment of the method for manufacturing a ceramic electronic component according to the present invention, the conductive paste layer is formed so that a section of the conductive paste layer for an end of the first or second internal electrode closer to the first or second end surface is thicker than a section of the conductive paste layer for a central section of the first or second internal electrode in the direction.

In another preferred embodiment of the method for manufacturing a ceramic electronic component according to the present invention, the conductive paste layers preferably includes a ceramic component.

A ceramic electronic component according to a preferred embodiment of the present invention includes a ceramic body, a first internal electrode, a second internal electrode, a first external electrode, and a second internal electrode. The ceramic body includes first and second principal surfaces, first and second side surfaces, and first and second end surfaces. The first internal electrode is provided in the ceramic body. The first internal electrode extends in a direction from the first end surface. The second internal electrode is provided in the ceramic body opposite to the first internal electrode with a ceramic layer interposed therebetween. The second internal electrode extends in a direction from the second end surface. The first external electrode is provided on the first end surface. The first external electrode is connected to the first internal electrode. The second external electrode is provided on the second end surface. The second external electrode is connected to the second internal electrode. The ceramic body includes a cross-linked section. The cross-linked section penetrates through the first internal electrode. The cross-linked section provides a cross-linkage for adjacent ceramic layers with the first internal electrode interposed therebetween. The first internal electrode includes a first opposed section and a first extraction section. The first opposed section is opposed to the second internal electrode with the ceramic layer interposed therebetween. The first extraction section is located closer to the first end surface than the first opposed section. The first extraction section is connected to the first external electrode. The number of cross-linked sections per unit area in the first extraction section is preferably less than the number of cross-linked sections per unit area in the first opposed section.

In a specific preferred embodiment of the ceramic electronic component according to the present invention, the end of the first extraction section closer to the first end surface is thicker than a central section of the first opposed section in a direction.

In another preferred embodiment of the ceramic electronic component according to the present invention, the number of cross-linked sections per unit area in the first extraction section is preferably about 1/5 or less of the number of cross-linked sections per unit area in the first opposed section, for example.

In yet another preferred embodiment of the ceramic electronic component according to the present invention, the number of cross-linked sections per unit area in the first extraction section is preferably about 1/10 or less of the number of cross-linked sections per unit area in the first opposed section, for example.

In yet another preferred embodiment of the ceramic electronic component according to the present invention, the end of the first extraction section closer to the first end surface is not provided with any cross-linked section.

In a further preferred embodiment of the ceramic electronic component according to the present invention, the cross-linked section preferably includes at least one of a ceramic component and a glass component.

In yet another preferred embodiment of the ceramic electronic component according to the present invention, the second internal electrode includes a second opposed section and a second extraction section. The second opposed section is opposed to the first opposed section with the ceramic layer interposed therebetween. The second extraction section is located closer to the second end surface than the second opposed section. The second extraction section is connected to the second external electrode. The number of cross-linked sections per unit area in the second extraction section is preferably less than the number of cross-linked sections per unit area in the second opposed section.

In yet another preferred embodiment of the ceramic electronic component according to the present invention, the end of the second extraction section closer to the second end surface is thicker than a central section of the second opposed section in a direction.

In yet another preferred embodiment of the ceramic electronic component according to the present invention, the end of the second extraction section closer to the second end surface is not provided with any cross-linked section.

According to various preferred embodiments of the present invention, the reliability of the ceramic electronic component is significantly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
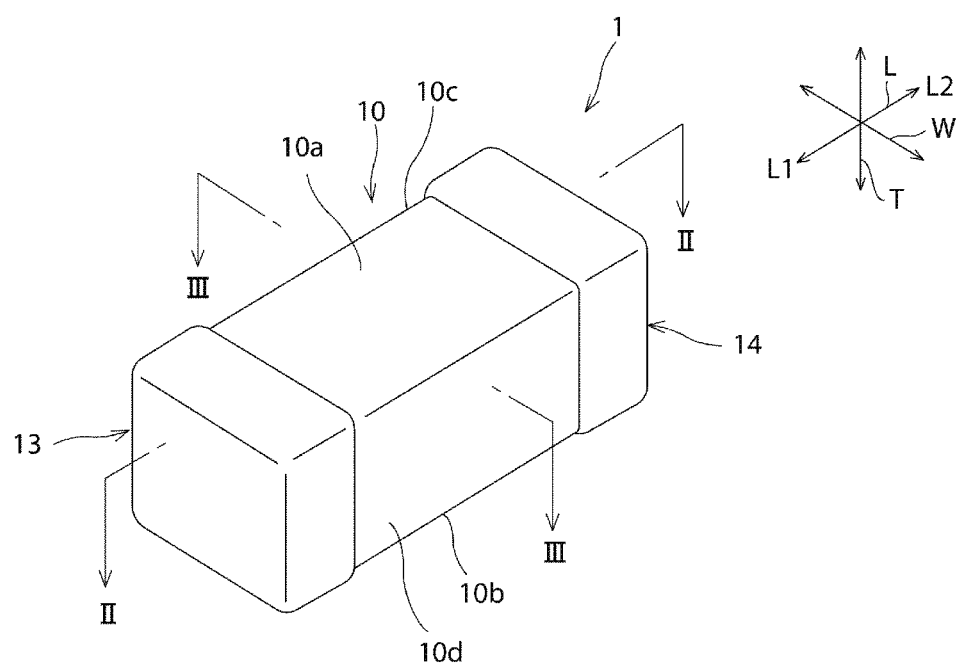
FIG. 1 is a schematic perspective view of a ceramic electronic component according to a preferred embodiment of the present invention.

Examples according to preferred embodiments of the present invention will be described below. However, the following preferred embodiments are by way of example only. The present invention is not limited to the following preferred embodiments in any way.

In addition, in the respective drawings referenced in the preferred embodiments, members which have substantially the same functions are denoted by the same symbols. In addition, the drawings referenced in the preferred embodiments are schematic. The dimensional ratios of the objects shown in the drawings may be different from the dimensional ratios of the real objects in some cases. The dimensional ratios of the objects may also be different between the drawings in some cases. The specific dimensional ratios of the objects should be determined in view of the following description.

Figure 2:
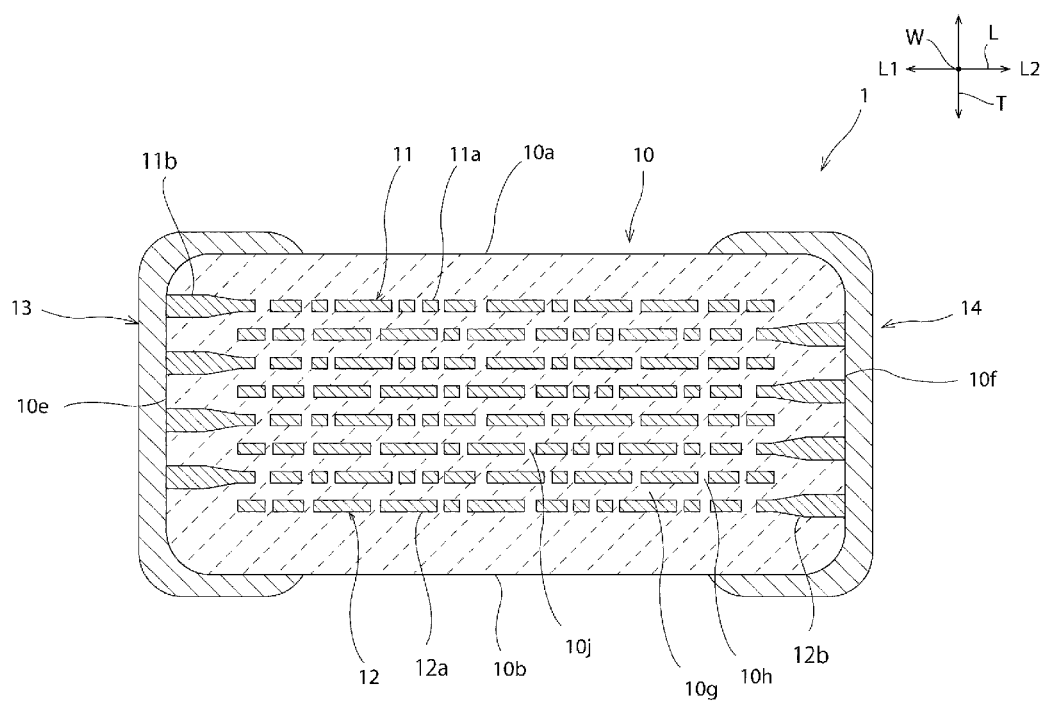
FIG. 2 is a schematic cross-sectional view of a portion along the line II-II of FIG. 1.
Figure 3:
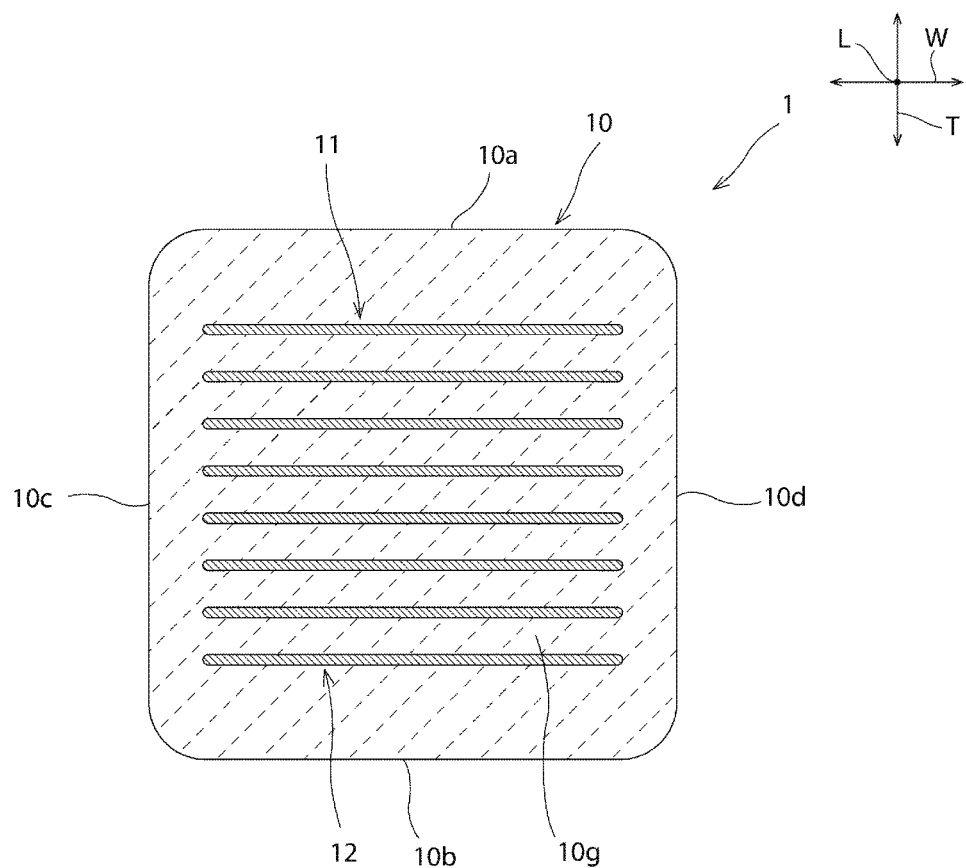
FIG. 3 is a schematic cross-sectional view of a portion along the line III-III of FIG. 1.

FIG. 1 is a schematic perspective view of a ceramic electronic component 1 according to a present preferred embodiment of the present invention. FIG. 2 is a schematic cross-sectional view of a portion along the line II-II of FIG. 1. FIG. 3 is a schematic cross-sectional view of a portion along the line III-III of FIG. 1.

The ceramic electronic component 1 includes a ceramic body 10. The ceramic body 10 includes first and second end surfaces 10e and 10f (see FIG. 2) that are parallel or substantially parallel to each other. Specifically, the ceramic body 10 preferably has a cuboid or substantially cuboid shape. The ceramic body 10 includes first and second principal surfaces 10a and 10b, first and second side surfaces 10c and 10d, and the first and second end surfaces 10e and 10f. The first and second principal surfaces 10a and 10b each extend in a length direction L and a width direction W. The first principal surface 10a and the second principal surface 10b are parallel or substantially parallel to each other. The first and second side surfaces 10c and 10d each extend in the length direction L and a thickness direction T. The first side surface 10c and the second side surface 10d are parallel or substantially parallel to each other. The first and second end surfaces 10e and 10f each extend in the width direction W and the thickness direction T. The first end surface 10e and the second end surface 10f are parallel or substantially parallel to each other.

It is to be noted that the term "substantially cuboid shape" is meant to include cuboids with corners and ridge lines chamfered, and cuboids with corners and ridge lines rounded.

The ceramic body 10 may be made of an appropriate ceramic material. The ceramic material defining the ceramic body 10 is selected appropriately depending on characteristics of the ceramic electronic component 1.

For example, when the ceramic electronic component 1 is a ceramic capacitor, the ceramic body 10 may preferably be made of a material including a dielectric ceramic as its main component. Specific examples of the dielectric ceramic include, for example, $BaTiO_3$, $CaTiO_3$, $SrTiO_3$, and $CaZrO_3$. For example, accessory components such as a Mn compound, a Co compound, a rare-earth element compound, and a Si compound may also preferably be added to the ceramic body 10 as appropriate.

As shown in FIGS. 2 and 3, first and second internal electrodes 11 and 12 are provided in the ceramic body 10. The first and second internal electrodes 11 and 12 are each provided in a length direction L and a width direction W. The first and second internal electrodes 11 and 12 are, in a thickness direction T, opposed to each other with a ceramic layer 10g interposed therebetween. The first internal electrode 11 is extracted to the first end surface 10e. The first internal electrode 11 extends in the length direction L from the first end surface 10e. The first internal electrode 11 is not extracted to the second end surface 10f or to the first or second side surface 10c or 10d.

The second internal electrode 12 is extracted to the second end surface 10f. The second internal electrode 12 extends in the length direction L from the second end surface 10f. The second internal electrode 12 is not extracted to the first end surface 10e or to the first or second side surface 10c or 10d. For this reason, each end of the ceramic body 10 in the length direction L includes a region with only one of the first and second internal electrodes 11 and 12 provided.

The first internal electrode 11 is connected to a first external electrode 13. The first external electrode 13 is provided on the first end surface 10e. In the present preferred embodiment, the first external electrode 13 is provided not only on the first end surface 10e, but also on portions the first and second principal surfaces 10a and 10b and portions of the first and second side surfaces 10c and 10d.

The second internal electrode 12 is connected to a second external electrode 14. The second external electrode 14 is provided on the second end surface 10f. In the present preferred embodiment, the second external electrode 14 is provided not only on the second end surface 10f, but also on portions of the first and second principal surfaces 10a and 10b and portions of the first and second side surfaces 10c and 10d.

The first and second internal electrodes 11 and 12 and the first and second external electrodes 13 and 14 can each be made of an appropriate conductive material. Specifically, the first and second internal electrodes 11 and 12 and the first and second external electrodes 13 and 14 may each preferably be made of at least one of Ni, Cu, Ag, Pd, Au, Pt, Sn, or other suitable conductive material, for example. The first and second external electrodes 13 and 14 may each preferably be made of, for example, a laminated body including more than one conductive layer.

As shown in FIG. 2, the first internal electrode 11 includes a first opposed section 11a and a first extraction section 11b. The first extraction section 11b is located closer to the first end surface 10e (L1 side) than the first opposed section 11a. The end of the first extraction section 11b closer to the first end surface 10e is thicker than a central section of the first opposed section 11a in the length direction L. The first internal electrode 11 is electrically connected to the first external electrode 13 at the first extraction section 11b.

The second internal electrode 12 includes a second opposed section 12a and a second extraction section 12b. The second extraction section 12b is located closer to the second end surface 10f (L2 side) than the second opposed section 12a. The end of the second extraction section 12b closer to the second end surface 10f is thicker than a central section of the second opposed section 12a in the length direction L. The second internal electrode 12 is electrically connected to the second external electrode 14 at the second extraction section 12b.

The first opposed section 11a and the second opposed section 12a are opposed to each other with the ceramic layer 10g interposed therebetween. The first extraction section 11b is located closer to the first end surface 10e (L1) than a tip of the second internal electrode 12 closer to the first end surface 10e (L1). For this reason, the first extraction section 11b is not opposed to the second internal electrode 12. The second extraction section 12b is located closer to the second end surface 10f (L2) than a tip of the first internal electrode 11 closer to the second end surface 10f (L2). For this reason, the second extraction section 12b is not opposed to the first internal electrode 11.

The ceramic body 10 includes a plurality of first cross-linked sections 10h and a plurality of second cross-linked sections 10j. A plurality of the first cross-linked sections 10h each penetrate through the first internal electrode 11, and provide cross-linkages for ceramic layers 10g adjacent with the first internal electrode 11 interposed therebetween. A plurality of the second cross-linked sections 10j each penetrate through the second internal electrode 12, and provide cross-linkages for ceramic layers 10g adjacent with the second internal electrode 12 interposed therebetween. These first and second cross-linked sections 10h and 10j fix the adjacent ceramic layers 10g. Therefore, the generation of delamination is prevented between the ceramic layers 10g and the internal electrodes 11 and 12. As a result, excellent reliability is achieved.

Further, the first and second cross-linked sections 10h and 10j can each preferably be made of, for example, a ceramic component or a glass component. The first and second cross-linked sections 10h and 10j may preferably include, for example, a ceramic component (a so-called common material) which has the same main component as that of the ceramic layers 10g.

It is to be noted that in addition to the first and second cross-linked sections 10h and 10j, voids may be provided to penetrate through the first and second internal electrodes 11 and 12 in some cases.

From the perspective of preventing delamination between the ceramic layers and the internal electrodes herein, it is preferable to provide cross-linked sections over the entire or substantially the entire internal electrodes. However, when the extraction sections are provided with cross-linked sections, the reliability of the electrical connections between the internal electrodes and the external electrodes may be decreased in some cases.

In the present preferred embodiment, for each first internal electrode 11, the number of cross-linked sections 10h per unit area in the first extraction section 11b electrically connected to the first external electrode 13 is preferably less than the number of cross-linked sections 10h per unit area in the first opposed section 11a. For this reason, delamination is effectively prevented between the first internal electrode 11 and the ceramic layer 10g, while maintaining the reliable connection between the first internal electrode 11 and the first external electrode 13 and the low electrical resistance between the first internal electrode 11 and the first external electrode 13.

It is to be noted that the number of cross-linked sections 10h per unit area in the first opposed section 11a may be defined as the number of cross-linked sections 10h in the first opposed section 11a, which are included in a given area, for example, about 50 μm long×about 10 μm wide, in a central section of the cross section shown in FIG. 2. Further, the number of cross-linked sections 10h per unit area in the first extraction section 11b may be defined as the number of cross-linked sections 10h in the first extraction section 11b, which are included in the same given area (for example, about 50 μm long×about 10 μm wide) obtained by horizontally moving the given area (about 50 μm long×about 10 μm wide) in the central section of the cross section shown in FIG. 2 to count the number of cross-linked sections 10h in the first opposed section 11a, leftward until coming into contact with the first end surface 10e in FIG. 2.

In addition, for each second internal electrode 12, the number of cross-linked sections 10j per unit area in the second extraction section 12b electrically connected to the second external electrode 14 is preferably less than the number of cross-linked sections 10j per unit area in the second opposed section 12a. For this reason, delamination is effectively prevented between the second internal electrode 12 and the ceramic layer 10g, while maintaining the reliable connection between the second internal electrode 12 and the second external electrode 14 and the low electrical resistance between the second internal electrode 12 and the second external electrode 14.

It is to be noted that the number of cross-linked sections 10j per unit area in the second opposed section 12a may be defined as the number of cross-linked sections 10j in the second opposed section 12a, which are included in a given area, for example, about 50 μm long×about 10 μm wide, in a central section of the cross section shown in FIG. 2. Further, the number of cross-linked sections 10j per unit area in the second extraction section 12b may be defined as the number of cross-linked sections 10j in the second extraction section 12b, which are included in the same given area (about 50 μm long×about 10 μm wide) obtained by horizontally moving the given area (50 μm long×10 μm wide) in the central section of the cross section shown in FIG. 2 to count the number of cross-linked sections 10j in the second opposed section 12a, rightward until coming into contact with the second end surface 10f in FIG. 2.

From the perspective of preventing delamination between the internal electrodes 11 and 12 and the ceramic layers 10g, the number of cross-linked sections 10h per unit area in the first extraction section 11b is preferably about 1/5 or less, and more preferably about 1/10 or less of the number of cross-linked sections 10h per unit area in the first opposed section 11a, for example. The end of the first extraction section 11b closer to the first end surface 10e is preferably provided with substantially no cross-linked sections 10h. The number of cross-linked sections 10j per unit area in the second extraction section 12b is preferably about 1/5 or less, and more preferably about 1/10 or less of the number of cross-linked sections 10j per unit area in the second opposed section 12a, for example. The end of the second extraction section 12b closer to the second end surface 10f is preferably provided with substantially no cross-linked sections 10j.

It is to be noted that the method for manufacturing the ceramic electronic component 1 is not particularly limited. The ceramic electronic component 1 can be manufactured, for example, in the following manner.

Figure 4:
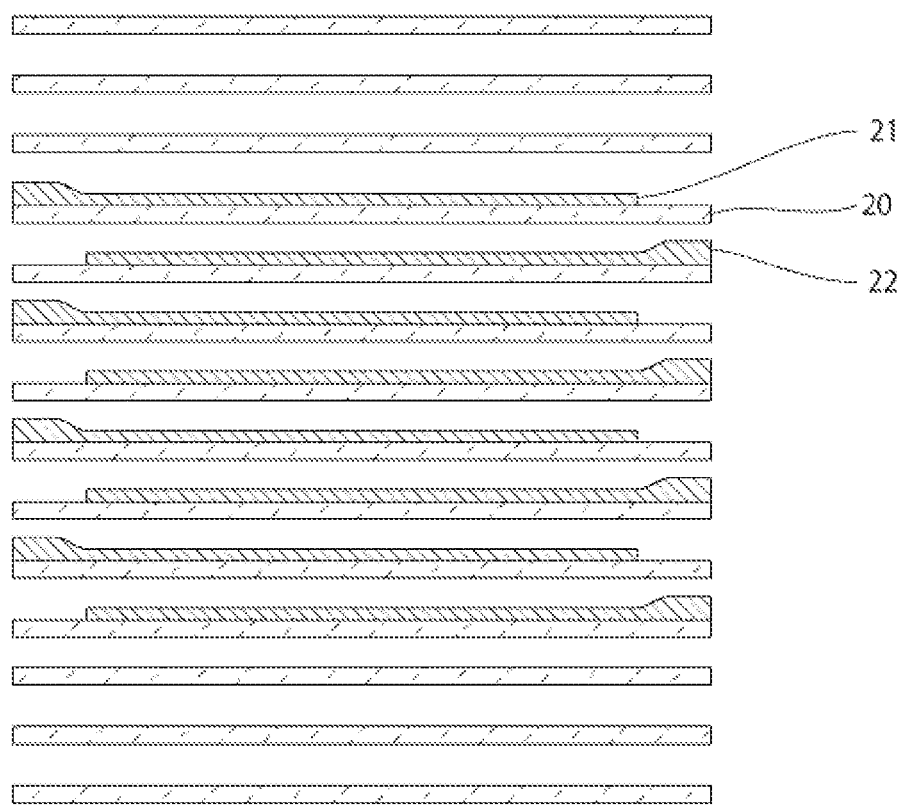
FIG. 4 is a schematic cross-sectional view for illustrating a method for manufacturing a ceramic electronic component according to a preferred embodiment of the present invention.

First, ceramic green sheets 20 (see FIG. 4) are prepared. The ceramic green sheets 20 can be prepared, for example, by printing a ceramic paste in accordance with a printing method, such as a screen printing method.

Next, a conductive paste is applied onto the ceramic green sheets 20 by a printing method, such as a screen printing method, for example, to form conductive paste layers 21 or 22 for the first or second internal electrodes 11 or 12. The conductive paste layers 21 and 22 preferably include a ceramic component or a glass component as a common material defining the cross-linked sections 10h and 10j in a subsequent firing step.

Next, a green sheet laminated body is prepared by appropriately stacking the ceramic green sheets 20 with no conductive paste layers 21 or 22 formed thereon, the ceramic green sheets 20 with the conductive paste layers 21 formed thereon, and the ceramic green sheets 20 with the conductive paste layers 22 formed thereon. After the stacking, the green sheet laminated body may be subjected to pressing.

Next, the green sheet laminated body is subjected to firing to prepare the ceramic body 10 including the first and second internal electrodes 11 and 12 therein. In this firing step, the green sheet laminated body is heated at a high rate such that a surface layer of the green sheet laminated body is fired earlier than a central section of the green sheet laminated body. For example, the heating temperature for the green sheet laminated body is preferably increased at about 50° C./second to about 150° C./second in a firing temperature range of at least about 500° C. Then, the ceramic component or glass component included in the conductive paste layers 21 and 22 is aggregated in central sections of the green sheets to form the cross-linked sections 10h and 10j. On the other hand, the firing rate is higher at the ends of the extraction sections 11b and 12b closer to the end surfaces 10e and 10f than in the central sections, and the ceramic component or the glass component is thus less likely to be aggregated to produce cross-linked sections. Accordingly, the ceramic body 10 is produced which includes the internal electrodes 11 and 12 in which the numbers of cross-linked sections 10h and 10j are relatively small at the ends of the extraction sections 11b and 12b closer to the end surfaces 10e and 10f.

The first and second external electrodes 13 and 14 can be formed, for example, by applying and firing a conductive paste onto the ceramic body 10, or formed by plating. Alternatively, the first and second external electrodes 13 and 14 may be formed by applying a conductive paste onto the green sheet laminated body, and firing the conductive paste layers together with the green sheet laminated body.

From the perspective of further reducing the numbers of cross-linked sections 10h and 10j at the ends of the extraction sections 11b and 12b closer to the end surfaces 10e and 10f, the conductive paste layers 21 and 22 are preferably formed so that a section of the conductive paste layer 21 or 22 for the end of the first or second internal electrode 11 or 12 closer to the first or second end surface 10e or 10f is thicker than a section of the conductive paste layer 21 or 22 for a central section of the first or second internal electrode 11 or 12 in the length direction L. The thickness of a section of the conductive paste layer 21 or 22 for the end of the first or second internal electrode 11 or 12 closer to the first or second end surface 10e or 10f is, for example, preferably about 1.5 times to about 2.5 times, and more preferably about 1.8 times to about 2.2 times as large as the thickness of a section of the conductive paste layer 21 or 22 for a central section of the first or second internal electrode 11 or 12 in the length direction L.

In addition, the electrical resistance of the extraction sections 11b and 12b at the external electrodes 13 and 14 can be reduced by making the ends of the extraction sections 11b and 12b thicker.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a ceramic electronic component including a ceramic body including first and second principal surfaces, first and second side surfaces, and first and second end surfaces, a first internal electrode provided in the ceramic body, the first internal electrode extending in a direction from the first end surface, a second internal electrode provided in the ceramic body to be opposed to the first internal electrode with a ceramic layer interposed therebetween, the second internal electrode extending in the direction from the second end surface, a first external electrode provided on the first end surface and connected to the first internal electrode, and a second external electrode provided on the second end surface and connected to the second internal electrode, wherein the ceramic body includes a cross-linked section penetrating through the first internal electrode, and providing a cross-linkage for the ceramic layers adjacent with the first internal electrode interposed therebetween, the first internal electrode includes a first opposed section opposite to the second internal electrode with the ceramic layer interposed therebetween and a first extraction section located closer to the first end surface than the first opposed section, the first extraction section being connected to the first external electrode, and the cross-linked section is provided in the first opposed section and the first extraction section, the method comprising:

a step of preparing a green sheet laminated body by stacking a plurality of ceramic green sheets including a ceramic green sheet for forming the ceramic body, the ceramic green sheet including, on a surface thereof, a conductive paste layer for forming the first or second internal electrode; and a firing step of preparing the ceramic body by firing the green sheet laminated body; wherein in the firing step, the green sheet laminated body is heated at a rate such that a surface layer of the green sheet laminated body is fired earlier than a central section of the green sheet laminated body, and a number of the cross-linked sections per unit area formed in the first extraction section is less than a number of the cross-linked sections per unit area formed in the first opposed section; and the number of the cross-linked sections per unit area in the first extraction section is about 1/5 or less of the number of the cross-linked sections per unit area in the first opposed section.

2. The method for manufacturing a ceramic electronic component according to claim 1, wherein for the green sheet laminated body in the firing step, a temperature is increased at about 50° C./second to about 150° C./second in a temperature range of at least about 500° C.

3. The method for manufacturing a ceramic electronic component according to claim 1, wherein the conductive paste layer is formed so that a section of the conductive paste layer for forming an end of the first or second internal electrode closer to the first or second end surface is thicker than a section of the conductive paste layer for forming a central section of the first or second internal electrode in the direction.

4. The method for manufacturing a ceramic electronic component according to claim 1, wherein the conductive paste layer includes a ceramic component.

5. A ceramic electronic component comprising:
a ceramic body including first and second principal surfaces, first and second side surfaces, and first and second end surfaces;
a first internal electrode provided in the ceramic body, the first internal electrode extending in a direction from the first end surface;
a second internal electrode provided in the ceramic body to be opposed to the first internal electrode with a ceramic layer interposed therebetween, the second internal electrode extending in the direction from the second end surface;
a first external electrode provided on the first end surface, and connected to the first internal electrode; and
a second external electrode provided on the second end surface, and connected to the second internal electrode; wherein
the ceramic body includes a cross-linked section penetrating through the first internal electrode, and providing a cross-linkage for the ceramic layers adjacent with the first internal electrode interposed therebetween;
the first internal electrode includes:
a first opposed section opposite to the second internal electrode with the ceramic layer interposed therebetween; and
a first extraction section located closer to the first end surface than the first opposed section, the first extraction section connected to the first external electrode; and
the cross-linked section is provided in the first opposed section and the first extraction section;
a number of the cross-linked sections per unit area in the first extraction section is less than a number of the cross-linked sections per unit area in the first opposed section; and
the number of the cross-linked sections per unit area in the first extraction section is about 1/5 or less of the number of the cross-linked sections per unit area in the first opposed section.

6. The ceramic electronic component according to claim 5, wherein an end of the first extraction section closer to the first end surface is thicker than a central section of the first opposed section in the direction.

7. The ceramic electronic component according to claim 6, wherein the end of the first extraction section closer to the first end surface is about 1.5 times to about 2.5 times as thick as the central section of the first opposed section in the direction.

8. The ceramic electronic component according to claim 6, wherein the end of the first extraction section closer to the first end surface is about 1.8 times to about 2.2 times as thick as the central section of the first opposed section in the direction.

9. The ceramic electronic component according to claim 5, wherein the number of the cross-linked sections per unit area in the first extraction section is about 1/10 or less of the number of the cross-linked sections per unit area in the first opposed section.

10. The ceramic electronic component according to claim 5, wherein an end of the first extraction section closer to the first end surface is not provided with the cross-linked section.

11. The ceramic electronic component according to claim 5, wherein the cross-linked section includes at least one of a ceramic component and a glass component.

12. The ceramic electronic component according to claim 5, wherein
the second internal electrode includes:
a second opposed section opposed to the first opposed section with the ceramic layer interposed therebetween; and
a second extraction section located closer to the second end surface than the second opposed section, the second extraction section connected to the second external electrode; and
a number of the cross-linked sections per unit area in the second extraction section is less than a number of the cross-linked sections per unit area in the second opposed section.

13. The ceramic electronic component according to claim 12, wherein an end of the second extraction section closer to the second end surface is thicker than a central section of the second opposed section in the direction.

14. The ceramic electronic component according to claim 13, wherein the end of the second extraction section closer to the second end surface is about 1.5 times to about 2.5 times as thick as the central section of the second opposed section in the direction.

15. The ceramic electronic component according to claim 13, wherein the end of the second extraction section closer to the second end surface is about 1.8 times to about 2.2 times as thick as the central section of the second opposed section in the direction.

16. The ceramic electronic component according to claim 13, wherein the ceramic body is made of one of $BaTiO_3$, $CaTiO_3$, $SrTiO_3$, or $CaZrO_3$.

17. The ceramic electronic component according to claim 12, wherein an end of the second extraction section closer to the second end surface is not provided with the cross-linked section.

18. The ceramic electronic component according to claim 12, wherein the number of the cross-linked sections per unit area in the second extraction section is about 1/5 or less of the number of the cross-linked sections per unit area in the second opposed section.

19. The ceramic electronic component according to claim 12, wherein the number of the cross-linked sections per unit area in the second extraction section is about 1/10 or less of the number of the cross-linked sections per unit area in the second opposed section.

* * * * *